United States Patent
Offer et al.

(10) Patent No.: US 11,275,834 B1
(45) Date of Patent: Mar. 15, 2022

(54) SYSTEM FOR ANALYZING BACKUPS FOR THREATS AND IRREGULARITIES

(71) Applicants: Richard Offer, Santa Clara, CA (US); Jennifer Coopersmith, San Jose, CA (US)

(72) Inventors: Richard Offer, Santa Clara, CA (US); Jennifer Coopersmith, San Jose, CA (US)

(73) Assignee: Richard Offer, Abingdon (GB)

( * ) Notice: Subject to any disclaimer, the term of this patent is extended or adjusted under 35 U.S.C. 154(b) by 619 days.

(21) Appl. No.: 15/870,793

(22) Filed: Jan. 12, 2018

Related U.S. Application Data

(60) Provisional application No. 62/445,397, filed on Jan. 12, 2017.

(51) Int. Cl.
| G06F 21/56 | (2013.01) |
| H04L 67/1097 | (2022.01) |
| G06F 9/455 | (2018.01) |

(52) U.S. Cl.
CPC ........ *G06F 21/564* (2013.01); *G06F 9/45558* (2013.01); *G06F 2009/45562* (2013.01); *G06F 2221/033* (2013.01); *H04L 67/1097* (2013.01)

(58) Field of Classification Search
CPC ............ G06F 21/564; G06F 2221/033; G06F 2009/45562; G06F 9/45558; H04L 67/1097
See application file for complete search history.

(56) References Cited

U.S. PATENT DOCUMENTS

| | | | | |
|---|---|---|---|---|
| 7,540,030 B1* | 5/2009 | Zaitsev | ................. | G06F 21/568 |
| | | | | 713/187 |
| 7,784,098 B1* | 8/2010 | Fan | ..................... | G06F 11/1471 |
| | | | | 726/24 |
| 8,347,388 B1* | 1/2013 | Dutch | ................ | G06F 11/1453 |
| | | | | 707/802 |
| 8,650,650 B1* | 2/2014 | Pavlyushchik | ....... | G06F 21/562 |
| | | | | 726/22 |
| 8,745,744 B2* | 6/2014 | Saika | .................. | G06F 11/1469 |
| | | | | 713/188 |
| 8,949,187 B1* | 2/2015 | Satish | ................. | G06F 11/1461 |
| | | | | 707/640 |
| 9,118,685 B1* | 8/2015 | Brocco | ................. | H04L 63/102 |
| 9,122,872 B1* | 9/2015 | Rusakov | ............... | G06F 21/565 |
| 9,424,074 B1* | 8/2016 | Pjesivac-Grbovic | ..... | G06F 9/48 |
| 9,804,909 B1* | 10/2017 | Fang | .................. | G06F 11/1451 |
| 10,346,258 B2* | 7/2019 | Sella | ................... | G06F 11/1458 |
| 11,010,260 B1* | 5/2021 | Savir | ..................... | G06N 7/005 |
| 2005/0114411 A1* | 5/2005 | Childs | ................ | G06F 11/1469 |
| 2006/0137010 A1* | 6/2006 | Kramer | ................ | G06F 21/554 |
| | | | | 726/22 |
| 2007/0283438 A1* | 12/2007 | Fries | .................... | G06F 21/562 |
| | | | | 726/24 |

(Continued)

*Primary Examiner* — Lynn D Feild
*Assistant Examiner* — Abdullah Almamun
(74) *Attorney, Agent, or Firm* — Rimon Law, P.C.

(57) ABSTRACT

Systems and method of identifying malware in backups are provided. Backups are subjected to analysis for malware signatures based on malware signature files that are received after the backup is produced. This approach allows the distinction between clean and infected restore points. The testing of backups for malware infection may be performed by a backup provider or an third party.

26 Claims, 2 Drawing Sheets

(56) References Cited

U.S. PATENT DOCUMENTS

| | | | |
|---|---|---|---|
| 2010/0162391 A1* | 6/2010 | Loveland | G06F 11/1461 |
| | | | 726/22 |
| 2015/0242282 A1* | 8/2015 | Gallagher | G06F 11/1433 |
| | | | 707/649 |
| 2016/0173499 A1* | 6/2016 | Bianchi | H04L 67/1057 |
| | | | 726/26 |
| 2016/0212174 A1* | 7/2016 | Raleigh | G06F 15/177 |
| 2016/0294847 A1* | 10/2016 | Coronado | G06F 16/23 |
| 2018/0024893 A1* | 1/2018 | Sella | G06N 7/005 |
| | | | 707/648 |
| 2018/0077219 A1* | 3/2018 | Tan | H04L 67/1097 |
| 2018/0114020 A1* | 4/2018 | Hirschberg | G06F 21/566 |
| 2019/0171362 A1* | 6/2019 | Dalmatov | H04L 9/0643 |

* cited by examiner

SYSTEM FOR ANALYZING BACKUPS FOR THREATS AND IRREGULARITIES

CROSS-REFERENCE TO RELATED APPLICATION

This application claims benefit and priority of U.S. Provisional Patent Application Ser. No. 62/445,397 filed Jan. 12, 2017. The disclosure of this application is hereby incorporated herein by reference.

BACKGROUND

Field of the Invention

The invention is in the field of computer management and more particularly in the field of computer security.

Related Art

In computing systems, backups are used to capture the state of the system for recovery if anything occurres to the primary system. Each representing a single point in time, a series of backups are used to allow an extended window of available restore points. A restore point is associated with a particular computer system state and time, and includes the restoration information required to reproduce the particular state. The restoration information can include a "full backup" and/or a one or more "partial backup" representing incremental changes since the last "full backup."

Computing systems may be infected by malware, e.g., Trojan horses, viruses, or ransomware. Infection may occur through receipt of an infected file or selection of a malicious link. The mechanism of infection is referred to as an "attack vector." In some cases, an infection may stay dormant on a computing system for an extended period of time before taking harmful action. As such, malware may be included in one or more backups before being discovered.

SUMMARY

Restoration of a computer system from a restore point may be required as a result of an issue such as a hardware failure or of a malware infection. In the case of a malware infection, it is not necessarily obvious which of the available restore points to use in a given situation. While the most recent restore point is a commonly best, in the case of a malware infection of the computer system, the most recent restore point may still include the attack vector and/or malicious code. In this case, restoring the most recent restore point simply restores the malicious code along with the rest of the system to an earlier point of time. Any data changes between the time the restore point was taken and the most recent restore point would be lost and the attack vector and/or malicious code would still be present, negating the reason for the restore in the first place.

In various embodiments of the invention, threat detection rates of malware are increased by pro-actively scanning backup restore points stored off-line. In various embodiments of the invention, malware in existing restore points is detected using malware signatures identified after a particular restore point was created. In various embodiments, restore points are tested for features other than the presence of malware. For example, in backing up an application, incorrect options might be used to perform a database dump, such that while data might be obtained from the primary, it is an inconsistent state such that it would not result in the same configuration that is running on the primary at that point in time. Depending on the level of divergence, the differences may represent a completely unusable restore point. Testing of restore points may be performed off line. For example, on a geographically remote server system.

In various embodiments, the most recent anti-malware threat detection assets are used to scan backups that are older than the threat detection assets. These assets can include anti-malware software as well as malware signature files. Backups may be scanned more than once, even if unchanged. For example, a backup may be scanned when first generated and then again as new malware threat detection assets become available. A backup that initially is determined to be free of malware may later be determined to be infected by malware, as the anti-malware threat detection assets are evolved to detect newly identified malware. When new detection assets are available, they may be used to examine a plurality of historical restore points of the same computing system.

Various Embodiments of the invention include a backup management system comprising: malware signature storage configured to store malware signature data, the malware signature data being configured for detection of malware; malware detection logic configured to scan content for malware using the malware signature data, the content including data or applications stored on a computing system; backup storage configured to store backups of the computing system; backup I/O configured to receive the backups from a remote client and to provide stored backups on request; backup storage logic configured to manage the storage of the backups; and scanning logic configured to use the malware detection logic to scan the backups using the malware detection logic and the malware signature data, and optionally configured to rescan the backups using new malware signature data when the new malware signature data becomes available.

Various Embodiments of the invention include a backup management system comprising: malware signature storage configured to store malware signature data, the malware signature data being configured for detection of malware; malware detection logic configured to scan content for malware using the malware signature data, the content including data or applications stored on a computing system; backup retrieval logic configured to retrieve backups from a backup storage; scanning logic configured to use the malware detection logic to scan the backups using the malware detection logic and the malware signature data, and optionally configured to rescan the backups using new malware signature data when the new malware signature data becomes available.

Various Embodiments of the invention include a method of maintaining a computing system, the method comprising: receiving a first backup of a computer system, the first backup including data or applications stored on a computing system; receiving first malware signature data; scanning the first backup using malware detection logic and the first malware signature data; receiving a second malware signature data, the second malware signature data having a later availability date relative to the first malware signature data; and rescanning the first backup using the malware detection logic and the second malware signature data, the rescanning using the second malware signature data resulting in detection of malware that was not detected by scanning the first backup using the first malware signature data; receiving a request for a member of a plurality of backups of the computing system, the request being received from an agent configured to restore the computing system using the member of the plurality of alternative backups; selecting a second backup from among a plurality of backups of the computing system, the selection of the second backup being based on the detection of malware in the rescanning of the first backup, the second backup being older than the first backup, both the first backup and the second backup being members of the plurality of backups; and providing the second backup to the agent.

Various embodiments of the invention include executing alternate scan algorithms when rescanning a given backup for malware, such that a scanning algorithm that requires more resources such as CPU, memory or has disk, is only executed if non-definitive results are obtained in less comprehensive scans.

DETAILED DESCRIPTION

Figure 1:
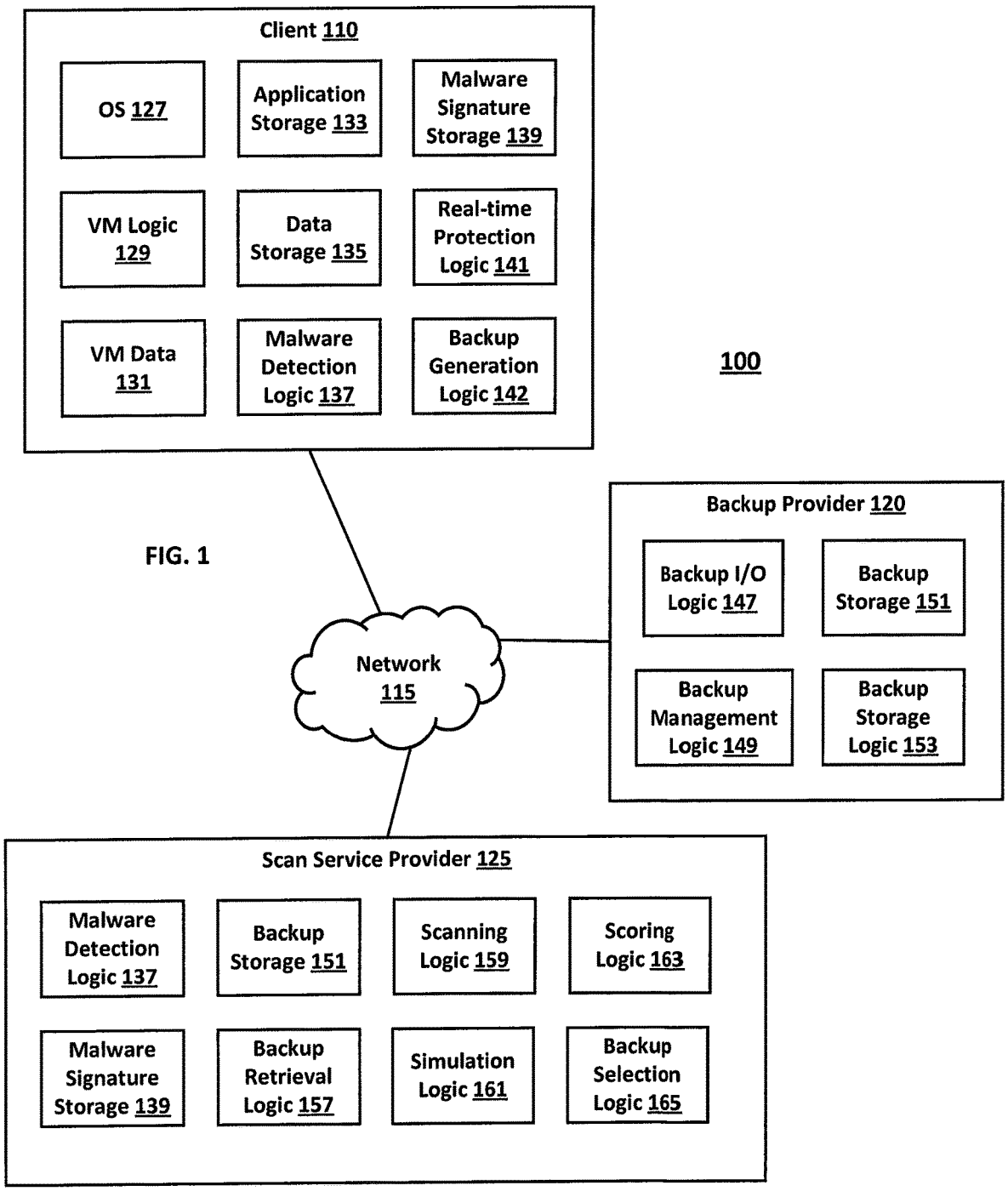
FIG. 1 Illustrates a threat protection system, according to various embodiments of the invention.

FIG. 1 illustrates a Threat Protection System 100, according to various embodiments of the invention. Threat Protection System 100 is configured to protect a Client 110 from various types of failure by the creation of restore points. The types of failure can include hardware failures, memory failures, software errors, human errors, and/or malware. The restore points include viable backups that can be used to reconstitute Client 110 to a prior state.

Client 110 can include one or more computing devices. For example, Client 110 may include a personal computer, a networked group of servers, and/or a distributed system of computing devices. Client 110 is optionally maintained by a third party, such as an enterprise software company. One or more of the computing devices are optionally virtual machines.

Threat Protection System 100 further includes a Backup Provider 120. Backup Provider 120 is configured to provide backup services. For example, Backup Provider 120 is configured to receive backups from one or more of Clients 110, to store these backups in a safe and secure manner, and to provide the stored backups for restoration of a client when needed.

Threat Protection System 100 further includes a Scan Service Provider 125. Scan Service Provider 125 is configured to detect malware, irregularities, and other problems with backups received by Backup Provider 120. In some embodiments, Scan Service Provider 125 is included as part of Backup Provider 120. Alternatively, Scan Service Provider 125 may be part of an independent system and possibly configured to provide scanning services to multiple instances of Backup Provider 120.

Client 110, Backup Provider 120 and Scan Service Provider 125 are typically connected by a Network 115. Network 115 may be the internet or other communication network. Backup Provider 120 and Scan Service Provider 125 are optionally configured to provide thread protection and/or backup services to a plurality of Clients 110.

Client 110 typically includes an OS (Operating System) 127 configured to support one or more computing applications. Examples of OS 127 include Unix, Linux, Microsoft Windows, iOS, Android, etc. OS 127 can include an operating system kernel. In some embodiments OS 127 is configured for execution of VM (Virtual Machine) Logic 129. VM Logic 129 is optionally a hypervisor and is configured for generating and managing one or more virtual machines on a single hardware system. Examples of VM Logic 129 include hypervisors such as IBM's CP/CMS, Microsoft Hyper-V, VMware vSphere, Citrix XenServer or cloud infrastructure such as Amazon AWS or Microsoft Azure, etc. Individual virtual machines may be characterized and/or defined by VM Data 131. Further instances of OS 127 may be found within individual virtual machines.

Client 110 further includes Applicant Storage 133 and/or Data Storage 135. Applicant Storage 133 is configured to store executable applications such as word processing software, web service software, accounting programs, database systems, and/or any other personal or enterprise applications. Data Storage 135 is configured for storing data used by OS 127 and/or applications stored in Application Storage 133. Such data can include web pages, database records, multi-media, configuration data, financial records, communication logs, and/or any other type of data typically stored on computing systems.

Client 110 optionally includes Malware Detection Logic 137. Malware Detection Logic 137 is configured to detect malware on Client 110. Malware Detection Logic 137 typically uses a set of malware signatures (e/g., snippets of computer code or checksums) to detect malware. The malware signatures are stored in Malware Signature Storage 139. Malware Detection Logic 137 operates by scanning the contents of OS 127, Application Storage 133, Data Storage 135, and/or working memory, and comparing these contents with malware signatures stored in Malware Signature Storage 139.

Various Malware Detection Logic 137 and/or sets of malware signatures are available from a variety of third party vendors, for example, Symantec, AVG AntiVirus, Kaspersky Labs, Bitdefender, Malwarebytes and AVAST software. The set of malware signatures, and optionally the Malware Detection Logic 137, are periodically updated by the vendors as new malware is identified. Each set of malware signatures is associated with an "availability date" representing the calendar data and time the set of malware signatures became available to Threat Protection System 100.

As used herein, the term "malware" is short for malicious software and can refer to computer viruses, worms, Trojan horses, ransomware, spyware, adware, scareware, key loggers, and other malicious programs. Malware can take the form of executable code, scripts, active content, and other software. Malware is defined by its malicious intent, acting against the requirements of the computer user. While the common use of "malware" does not include software that only causes unintentional harm due to some deficiency, e.g. a bug, corruption or security vulnerability, for the purposes of this application such software may also be considered "malware." The full term "malicious software" is used when explicitly referring to malware excluding software that causes unintentional harm.

Client 110 optionally further includes Real-time Protection Logic 141. Real-time Protection Logic 141 may be part of Malware Detection Logic 137 and is configured to detect malware in working memory and in communications to or from Client 110.

Client 110 optionally further includes Backup Generation Logic 142. Backup Generation Logic 142 is configured to generate backups of Client 110. These backups can be for a single or multiple computing device within Client 110. They can include the contents of Application Storage 133, Data Storage 135, OS 127, VM Logic 129, VM Data 131, working memory, and/or the like. They can also include information such as application execution logs, installation logs, file modification logs, communication logs between parts of Client 110 or between Client 110 and external devices, and/or the like. The backups can also include metadata charactering system configuration at various times. Backups generated by Backup Generation Logic can be full or incremental backups. Incremental backups represent backups of content that has changed since the last full or partial backup. Each backup is associated with a particular time and state of Client 110. Backups generated using Backup Generation Logic 142 are intended to produce restoration point to which a state of Client 110 can be fully or partially reproduced.

In some embodiments, Backup Generation Logic 142 is configured to backup Client 110 while Client 110 is in use. For example, a backup may be generated while Client 110 is updating database entries, engaging in financial transactions or serving web pages. In this case, the backup is optionally made of a mirrored copy of Client 110 such that operation of Client 110 is not significantly slowed. Malware Detection Logic 137 optionally also uses this mirrored copy for malware scans.

Backup Generation Logic 142 may also be configured to return Client 110 to a prior state using a previously generated backup. For example, Backup Generation Logic 142 may be configured to write over Client 110 with a full backup and one or more incremental backups as needed. In some embodiments, Backup Generation Logic 142 may restore just selected or needed file(s) from a backup.

Client 110, Backup Provider 120 and Scan Service Provider 125 further include hardware elements (not shown) such as a power source, microprocessor, working memory, network connections, a display, I/O devices, etc.

Backup Provider 120 is configured to receive backups of Client 110 from Backup Generation Logic 142. These backups may be received via Backup I/O Logic 147, which is typically also configured to provide backups back to Client 110 for restoration to a restore point on request. Backup Provider 120 may be disposed at a location of part of Client 110 and/or at one or more locations geographically distant from Client 110, e.g, in a different city.

Backups of Client 110 received by Backup Provider 120 are stored in Backup Storage 151. Backup Storage 151 may be distributed over multiple locations and is managed by Backup Storage Logic 153. Backup Storage Logic 153 optional includes a database management system.

Backup Management Logic 149 is configured to manage the stored backups. This management can include tracking associations between different backups and different user accounts or different instances of Client 110. In some embodiments, Backup Management Logic 149 is configured to apply data retention policies to the stored backups. These policies may cause a backup to become "expired" after a certain date or storage period, and thus be queued for removal, e.g., deletion. Optionally, the removal of backups is dependent on malware scans performed using Scan Service Provider 125, as discussed further elsewhere herein. Backup Management Logic 149 is optionally configured to generate a first full backup from a second full backup and a set of incremental backups. This may require that each of the incremental backups have been scanned for malware by Scan Service Provider 125 and optionally that they have received a "pass" rating or sufficiently high score.

Scan Service Provider 125 includes instances of Malware Detection Logic 137 and Malware Signature Storage 139. However, in some embodiments, Scan Service Provider 125 includes Malware Detection Logic 137 and/or malware signatures from several different sources. As such, a particular backup may be scanned using several different sets of malware signatures from different signature vendors.

Scan Service Provider 125 optionally further includes an instance of Backup Storage 151. This instance of Backup Storage 151 may be smaller than that found in Backup Provider 120. For example it may comprise merely working memory sufficient to store a backup currently being processed/scanned.

Scan Service Provider 125 optionally further comprises Backup Retrieval Logic 157. Backup Retrieval Logic 157 is configured to retrieve backups from a Backup Storage 151 of Backup Provider 130 and place the retrieved backup in Backup Storage 151 of Scan Service Provider 125. In some embodiments Backup Retrieval Logic 157 requires multiple steps to prepare the backup for scanning. In some embodiments, Backup Retrieval Logic 157 is configured to appear, as an instance of Backup Generation Logic 142 from the point of view of Backup Provider 120. For example, Backup Provider 120 may be configured to provide backups to Backup Generation Logic 142, for the purposes of restoration, on request and only on receipt of proper security credentials. Backup Retrieval Logic 157 may be provided with the security credentials and be configured to request backups using an API of Backup Provider 120 that would normally be used by Backup Generation Logic 142. Thus, Scan Service Provider 125 may retrieve backups from Backup Provider 120 without modification of Backup Provider 120.

Backup Retrieval Logic 157 may be configured to select backups from Backup Storage 151 in response to specific events. For example, if a new (either full or incremental) backup is received from Client 110, then Backup Retrieval Logic 157 may be configured to automatically retrieve the new backup for scanning. Likewise, if a new set of malware signatures and/or a new Malware Detection Logic 137 are received by Scan Service Provider 125, then Backup Retrieval Logic 157 may be configured to automatically retrieve backups stored in Backup Storage 151 for rescan. In some embodiments, only the most recent backup of Client 110 is retrieved and rescanned, unless new malware is discovered within that backup. If malware is discovered on the most recent backup, then the next most recent backup may be retrieved and rescanned. This process optionally continues (scanning older and older backups) until a backup without the newly discovered malware is found.

Scan Service Provider 125 optionally further comprises Scanning Logic 159. Scanning Logic 159 is configured to use Malware Detection Logic 137 and sets of malware signatures stored in Malware Signature Storage 139 to scan retrieved backups. Scanning Logic 159 is optionally also configured to rescan previously scanned backups using new sets of malware signatures and/or new Malware Detection Logic 137 when the new malware signatures or new Malware Detection Logic 137 become available. The rescanning of previously scanned backups is optionally automatically performed in response to the receipt of the new malware signatures or new Malware Detection Logic 137. In some embodiments, rescans are also automatically performed in response to receipt of a request for a backup to restore Client 110, e.g., in response to receiving a restoration request for a restoration point. In some embodiments the results of a scan performed by Scanning Logic 159 is kept in Backup Storage 151 beyond the expiration of the backup or restore point for forensic purposes. These results include, for example, file and path name, file size, modification timestamp, checksums for each file included in the backup, scores and identified malware and irregularities.

"Irregularities" are indicators of possible future issues. For example, an irregularity might be that backup sizes between different backups are constant, or that the backup size has changed by a significant amount, or that the backup took longer than usual. Other examples of an irregularity include logged access to Client 110 from an unusual or unauthorized device, lack of system security files, unexpected changes to data, an unusually high volume of data transfer. An irregularity is not necessarily an indicator of malware, but it might be an early indication of an issue with the validity, health or usefulness of a backup. Irregularities may result from an action by a user. For example, an irregularity may occur if a user improperly removes some virtual machines and/or other aspects of Client 110 from a backup schedule, or otherwise improper changes to Client 110.

In some embodiments, Scanning Logic 159 is configured to decompress a backup prior to scanning the backup. To reduce the computation required for scanning, Scanning Logic 159 is optionally configured to selectively scan files based on one or more scan policies such as the size of the file, a file extension, a file type, a file name or path, a modification time of the file, and/or if a checksum for the file has changed. In some embodiments, large files, such as large video or multi-media files, are scanned only at their beginning and ends. Thus, avoiding scanning center sections of these files.

In various embodiments, an incremental backup may or may not be scanned in conjunction with the other backups that it depends on. For example, an incremental backup may be scanned by itself, or as part of a restore point reconstructed from a full backup and one or more incremental backups.

Scan Service Provider 125 optionally further comprises Simulation Logic 161. Simulation Logic 161 is configured to simulate a state of Client 110 at a restore point. Simulation Logic 161 can be used for sandboxing restoration and execution of a restore point and/or letting one or more applications within a restore point run in isolation. Scans (or rescans) of the restore point can then be performed on the simulation using Scanning Logic 159, Malware Detection Logic 137 and sets of malware signatures. The simulation optionally includes provisioning of a virtual machine based on data, e.g., configuration data, included in the restore point. Simulation Logic 161 may be configured to reproduce virtual machines generated by VM Logic 129. Alternatively, Simulation Logic 161 may be configured to provision a container, virtualized application, and/or a physical computing system.

In some embodiments, Simulation Logic 161 is configured to simulate a plurality of computing devices of Client 110. For example, Simulation Logic 161 may be configured to generate a plurality of virtual machines and to simulate communication channels there between. In these embodiments a scans (and rescans) may be performed on the connected plurality of computing devices. In some embodiments, Simulation Logic 161 is configured to generate a first full backup from a second full backup and a set of incremental backups. Each of the incremental and/or full backups may have been scanned using multiple sets of malware signature data, the sets of malware signature data having a plurality of different availability dates. The first full backup can then be rescanned using the latest Malware Detection Logic 137 and set of malware signatures.

In some embodiments, Malware Detection Logic 137 is configured to counteract malware identified in the restore point. For example, Malware Detection Logic 137 may be configured to remove, make safe, neutralize, deactivate or isolate identified malware. In these embodiments, the counteraction may occur in a simulation of the restore point generated using Simulation Logic 161. Optionally, once the malware is counteracted, an instance of Backup Generation Logic 142 is used to generate a new backup wherein the malware has been counteracted. Thus, a replacement version of the restoration point may be generated. This replacement version may be used to restore an instance of Client 110 and/or be stored in Backup Storage 151 of Backup Provider 120.

Scan Service Provider 125 optionally further comprises Scoring Logic 163. Scoring Logic 163 is configured to generate relative scores of backups of the computing system. Scores may be based on the identity, number and severity of malware found within a backup. For example, mildly annoying adware may result in a small decrease in score while ransomware may result in a large decrease in score. The score may also be based on other irregularities that impact the health or usefulness of a backup. For example, a corrupted file allocation table or database may cause Scoring Logic 163 to reduce the score of a backup. Scores may be based on an ability to counteract malware identified within backups. For example, malware that can be counteracted will typically result in less of a score reduction relative to malware that cannot be counteracted as well. In some embodiments, a score must be above a predefined threshold to be considered "pass" or usable for restoration of Client 110. Scores generated by Scoring Logic 163 may be used as relative representations of the quality of backups, and may be used for selection of backups for use in restoration of Client 110. Relative scores are referred to as "relative" because they can be compared, even if calculated on an absolute scale.

Scan Service Provider 125 optionally further comprises Backup Selection Logic 165. Backup Selection Logic 165 is configured to select a preferred backup from among a plurality of backups of Client 110 as stored in Backup Storage 151. The preferred backup is the backup "best" used to restore Client 110. The selection is responsive to outputs of Scanning Logic 159, Scoring Logic 163, and/or Malware Detection Logic 137. For example, backups that score poorly and/or have identified ransomware are less likely to be selected by Backup Selection Logic 165 relative to backups that have little malware and/or score well. These factors are balanced by Backup Selection Logic 165 against the age (e.g., date) of a backup, the most recent backup being preferred. If a newer backup has identified malware, then an older backup (lacking the malware) may be preferred. In some embodiments, Backup Selection Logic 165 is configured to select the preferred backup based on a date of the backup and malware identified in a non-preferred backup among the plurality of backups of Client 110 stored in Backup Storage 151.

In some embodiments, Backup Selection Logic 165 is configured to request input from a user as to which backup to use in a restoration and/or to request input from a user as to what criteria should be used to determine what is "best." In some embodiments, Backup Selection Logic 165 is configured to select more than one preferred backup, the selection being based on compatibility for producing a mixed restoration. A mixed restoration is a restoration of Client 110 in which objects, e.g., files, are taken from different restoration points. For example, if the only significant problem with a recent backup is malware in a File "R" then that backup may be used except for the File "R." The File "R" may then be restored from an older backup.

Figure 2:
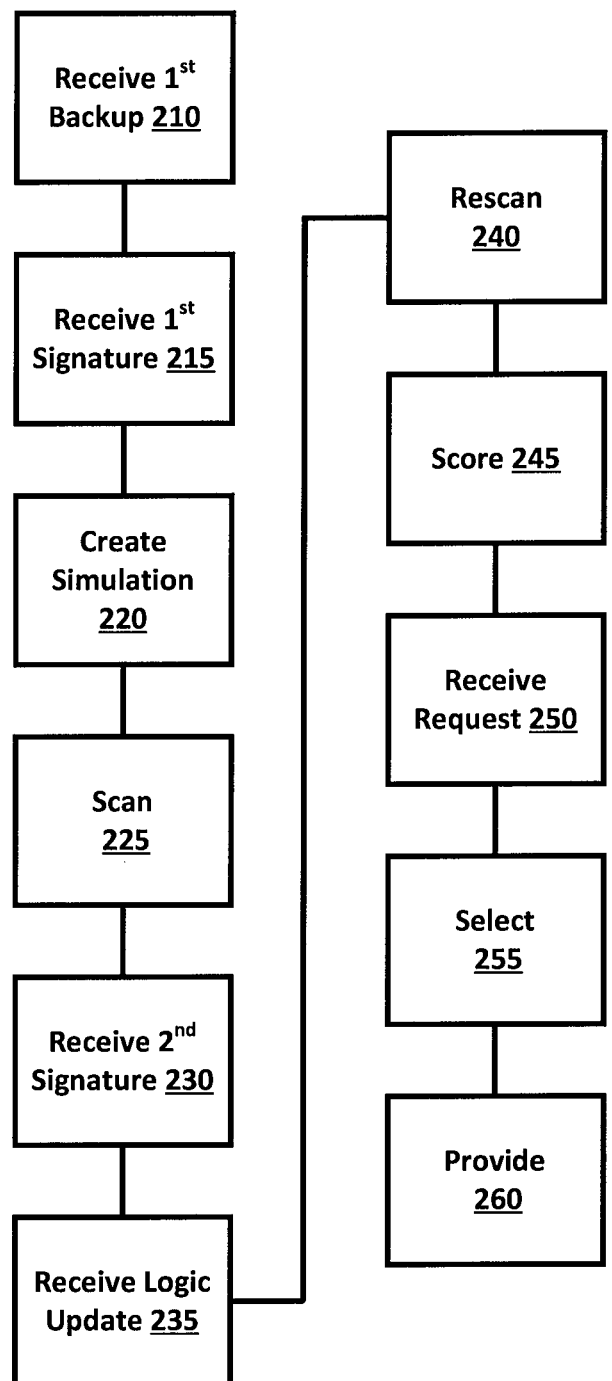
FIG. 2 illustrates methods of maintaining a computing system, according to various embodiments of the invention.

FIG. 2 illustrates methods of maintaining a computing system, according to various embodiments of the invention. These methods are optionally performed using the systems illustrated in FIG. 1. Two notable elements of these methods include scanning backups for malware and rescanning backups when newer malware signatures are received. Separate scans may be used to detect malware and malicious software. Further, the separate scans may be performed using different scanning policies.

In a Receive 1$^{st}$ Backup Step 210, a first backup of Client 110 is received. The first backup typically associated with a restoration point and including data and/or applications stored on Client 110. The first backup is received by Scan Service Provider 125 and may be received from Backup I/O Logic 147 or Backup Generation Logic 142. In some embodiments, the first backup is received from a mirror of Client 110. Backup Generation Logic 142 is an example of an "agent" of Backup Provider 120 running on Client 110. The first backup is optionally one of a plurality of backups of Client 110. The plurality of backups may include full and/or incremental backups. The designation of the first backup, or other elements, as "first" is meant to distinguish it from a "second" backup, etc., not to mean that it is the first backup ever received from Client 110.

In a Receive 1$^{st}$ Signature Step 215, first malware signature data is received by Scan Service Provider 125 and optionally Client 110. The first malware signature data typically includes a set of malware signatures and is stored in Malware Signature Storage 139. The first malware signature data can include, for example, checksums indicating malicious software, information about vulnerable versions of OS 127 and/or VM Logic 129, expected checksums of applications stored in Application Storage 133, data identifying malicious content in communication or application logs, such as suspicious domain names and URLs, details of software packages and patches installed. In some embodiments, the first malware signature data is received from more than one remote sources of malware signature data. For example, the first malware signature data can include sets of malware signatures from a plurality of different third-party vendors.

In an optional Create Simulation Step 220, a simulation of Client 110 at a time of the first backup is created. The simulation can include a virtual machine, container, virtualized application, and/or a physical computing system, in which a restoration point/backup is provisioned.

In a Scan Step 225, the first backup is scanned using Malware Detection Logic 137 and the first malware signature data received in Receive 1$^{st}$ Signature Step 215. If a simulation of Client 110 has been created then the first backup is deployed and scanned as deployed in the simulation.

In an optional Receive 2$^{nd}$ Signature Step 230, a second (set of) malware signature data is received by Scan Service Provider 125 and optionally Client 110. The second malware signature data is stored in Malware Signature Storage 139. The second malware signature data has a later availability date relative to the first malware signature data, and thus may include signatures of additional malware.

In an optional Receive Logic Update Step 235, an updated Malware Detection Logic 137, configured to detect malware using the second malware signature data is received by Scan Service Provider 125. The updated Malware Detection Logic 137 may be received from one or more third party vendors of Malware Detection Logic 137.

In an optional Rescan Step 240, the first backup is rescanned using Malware Detection Logic 137 (on Scan Service Provider 125) and the second malware signature data. Rescan Step 240 may result in detection of malware that was not detected by scanning the first backup using the first malware signature data, if the second malware signature data includes additional malware signatures. If an updated Malware Detection Logic 137 was received in Receive Logic Update Step 235, then the rescan performed in Rescan Step 240 is typically performed using the updated Malware Detection Logic 137.

In various embodiments, Scan Step 225 and Rescan Step 240 occur at least one day, at last one week, at least four weeks or at least two months, apart. Scan Step 225 and Rescan Step 240 optionally include storage of scan results in Backup Storage 151. These scan results can include, for example, filename (including extension), file size, file, file type based on actual file content, and/or the like. Scan Step 225 and Rescan Step 240 can be performed using different scan policies. For example, Scan Step 225 may include searching for a corrupted file table or corrupted database table, or exclude files in a particular directory such as c:\Windows\System32, while Rescan Step 240 need not include/exclude these particular searches.

In an optional Score Step 245, a first relative score for the first backup is determined using Scoring Logic 163. The determination being based on results of the scanning of the first backup using the first set of malware signatures. Score Step 245 optionally further includes determining a second relative score for the first backup based on results of the scanning of the first backup using the second set of malware signatures.

In a Receive Request Step 250, a request for a member of a plurality of backups of Client 110 is received. The request is optionally received from an agent configured to restore the computing system using the member of the plurality of alternative backups, e.g., Backup Generation Logic 142. The request may be received by Backup Provider 120 and/or Scan Service Provider 125.

In a Select Step 255, a backup is selected from among a plurality of backups of Client 110 stored in Backup Storage 151. The selected backup is optionally a second backup distinct from the first backup, e.g., a backup made at a different time and part of a different restore point than the first backup. The selection of the second backup is optionally based on detection of malware in the rescanning of the first backup in Rescan Step 240. The second backup is optionally older than the first backup. Thus, due to the detection of malware on rescanning with a newer malware signature, an older backup is selected over a newer backup. In some embodiments multiple backups are selected in order to create a mixed restoration. Select Step 255 optionally includes providing a user with information regarding available backups, e.g., their score and/or malware status, and receiving a selection from among the available backups from the user.

In a Provide Step 260, the backup(s) selected in Select Step 255 is provided to an agent configured to restore Client 110 to a restoration point associated with the selected backup. The agent is optionally an instance of Backup Generation Logic 142.

Several embodiments are specifically illustrated and/or described herein. However, it will be appreciated that modifications and variations are covered by the above teachings and within the scope of the appended claims without departing from the spirit and intended scope thereof. For example, the elements illustrated in FIG. 1 may be redistributed among different physical or virtual devices. Scan Service Provider 125 is optionally a cloud based system.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems referred to herein can comprise an integrated circuit, a microprocessor, a personal computer, a server, a distributed computing system, a communication device, a network device, or the like, and various combinations of the same. A computing system may also comprise volatile and/or non-volatile memory, referred to herein as "memory" or "storage," such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database and/or file system. The various examples of logic noted above comprise hardware, firmware, or software stored on a computer-readable medium, or combinations thereof. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

What is claimed is:

1. A backup management system comprising:
malware signature storage configured to store malware signature data, the malware signature data being configured for detection of malware;
malware detection logic configured to scan content for malware using the malware signature data, the content including data or applications stored on a computing system;
backup storage configured to store backups of the computing system;
backup I/O configured to receive the backups from a remote client and to provide stored backups on request;
backup storage logic configured to manage the storage of the backups;
scanning logic configured to use the malware detection logic to scan the backups using the malware detection logic and the malware signature data, and configured to rescan the backups using new malware signature data when the new malware signature data becomes available;
scoring logic configured to generate relative scores of backups of the computing system, wherein the scores are based on at least identification of malware signatures in the backups; and
a microprocessor.

2. The system of claim 1, further comprising backup management logic configured to remove expired backups from the backup storage, wherein the removal of expired backups is dependent on the detection of malware within the stored backups.

3. The system of claim 1, further comprising simulation logic configured to simulate a state of a computing system at a restore point, the simulation including provisioning of a virtual machine.

4. The system of claim 1, further comprising backup selection logic configured to select a preferred backup from among a plurality of backups of the computing system, the selection being responsive to an output of the scanning logic.

5. A backup management system comprising:
malware signature storage configured to store malware signature data, the malware signature data being configured for detection of malware;
malware detection logic configured to scan content for malware using the malware signature data, the content including data or applications stored on a computing system;
backup retrieval logic configured to receive backups from a backup storage;
scanning logic configured to use the malware detection logic to scan the backups using the malware detection logic and the malware signature data, and configured to rescan the backups using new malware signature data when the new malware signature data becomes available;
backup selection logic configured to select a preferred backup from among a plurality of backups of the computing system, the selection being responsive to an output of the scanning logic;
scoring logic configured to generate relative scores of backups of the computing system, wherein the scores are based on at least identification of malware signatures in the backups; and
a microprocessor.

6. The system of claim 5, further comprising backup management logic configured to remove expired backups from the backup storage, wherein the removal of expired backups is dependent on the detection of malware within the stored backups.

7. The system of claim 6, wherein the backup management logic is configured to generate a first full backup from a second full backup and a set of incremental backups, each of the incremental backups having been scanned using the malware signature data and the new malware signature data.

8. The system of claim 6, wherein the backup management logic is configured to remove an expired backup only if a more resent backup of the same computing system has received at least a minimum score from the scanning logic.

9. The system of claim 5, further comprising simulation logic configured to simulate a state of a computing system at a restore point, the simulation including provisioning of a virtual machine.

10. The system of claim 9, wherein the simulation logic is configured to provision the virtual machine using computing system configuration data included in the content.

11. The system of claim 9, wherein the simulation logic is configured to generate a first full backup from a second full backup and a set of incremental backups, each of the incremental backups having been scanned using multiple sets of malware signature data, the sets of malware signature data having a plurality of different availability dates.

12. The system of claim 9, wherein the malware detection logic is configured to counteract malware identified in the restore point, and the simulation logic is configured to generate a replacement version of the restore point with the malware counteracted.

13. The system of claim 5, further comprising scoring logic configured to generate relative scores of backups of the computing system, wherein the scores are based on identification of malware signatures within the backups.

14. The system of claim 13, wherein the relative scores are based on identities of malware identified in the backups.

15. The system of claim 13, wherein the relative score is based on both detected malware and health of the backups.

16. The system of claim 13, wherein the relative score is based on an ability to counteract malware identified in the backups. .

17. The system of claim 13, further comprising backup selection logic configured to select a preferred backup from among a plurality of backups of the computing system, the selection being responsive to an output of the scoring logic, wherein the backup selection logic is configured to select the preferred backup based on the relative scores.

18. The system of claim 5, wherein the malware signature storage is configured to store multiple sets of malware signature data, each set of malware signature data having a different availability date.

19. The system of claim 5, wherein the malware signature storage is configured to store multiple sets of malware signature data from different signature sources, and the malware detection logic is configured to scan content for malware using the multiple sets of malware signature data.

20. The system of claim 5, wherein the content includes logs of network traffic, file changes or application executions, and the malware detection logic is configured to detect malware signatures within the network traffic, file changes or application executions.

21. The system of claim 5, wherein the scanning logic is configured to selectively scan files as a function of file size, file name or file extension, or the scanning logic is configured to avoid scanning center sections of large media files.

22. The system of claim 5, wherein the backup selection logic is configured to select the preferred backup based on a date of the preferred backup and malware identified in a non-preferred backup among the plurality of backups of the computing system.

23. The system of claim 5, wherein the backup selection logic is configured to select more than one preferred backup, the selection being based on compatibility of the more than one preferred backup for producing a mixed restoration.

24. A backup management system comprising:
  malware signature storage configured to store malware signature data, the malware signature data being configured for detection of malware, wherein the malware signature storage includes non-volatile memory;
  malware detection logic configured to scan content for malware using the malware signature data, the content including data or applications stored on a computing system;
  backup retrieval logic configured to receive backups of a computing system from a remote device;
  scanning logic configured to scan the backups using the malware detection logic and the malware signature data;
  backup selection logic configured to select a preferred backup from among the backups of the computing system for retrieval using the backup retrieval logic, the selection being responsive to an output of the scanning logic;
  scoring logic configured to generate relative scores of backups of the computing system, wherein the scores are based on at least identification of malware signatures in the backups; and
  a microprocessor.

25. The system of claim 24, wherein the scanning logic is configured to store a log of checksums of content and to compare the stored checksums to malware signature data received after the content is backed up to the remote device and before the content is retrieved from the remote device.

26. The system of claim 24, further comprising simulation logic configured to simulate a state of a computing system at a restore point using the received backups, the simulation including provisioning of a virtual machine, wherein the backup retrieval logic is configured to decompress the received backups into the virtual machine, and wherein the scanning logic is configured to counteract malware within the simulated restore point as provisioned in the virtual machine, to create a new backup including the restore point wherein the malware has been counteracted.

* * * * *